No. 835,362. PATENTED NOV. 6, 1906.
W. L. MERRILL.
OPERATING BULKHEAD DOORS.
APPLICATION FILED JAN. 19, 1906.
2 SHEETS—SHEET 1.
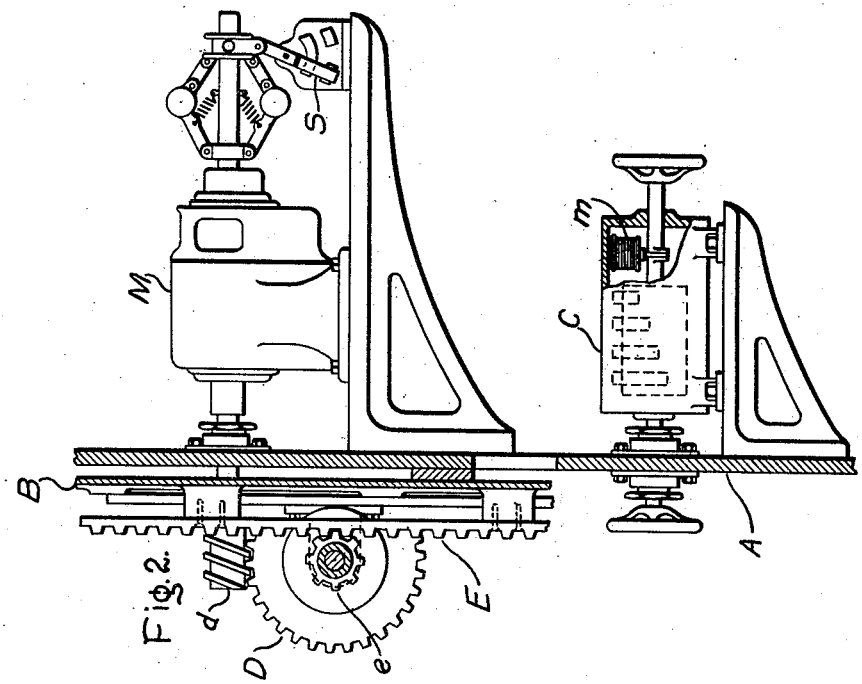
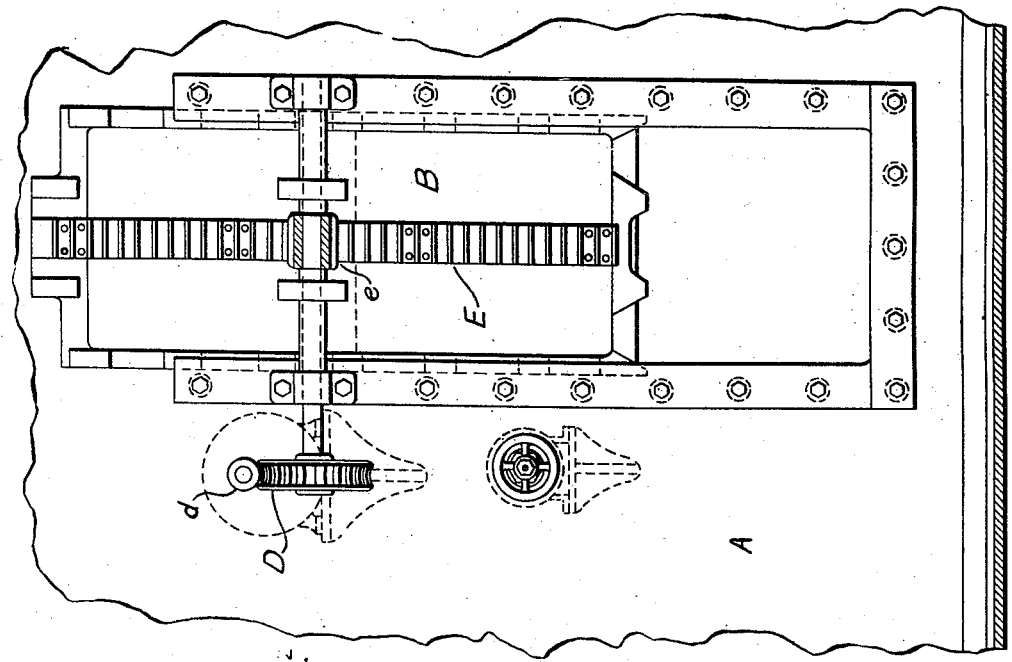
Witnesses:
Inventor:
Wilbur L. Merrill.
by Att'y.

No. 835,362. PATENTED NOV. 6, 1906.
W. L. MERRILL.
OPERATING BULKHEAD DOORS.
APPLICATION FILED JAN. 19, 1906.
2 SHEETS—SHEET 2.
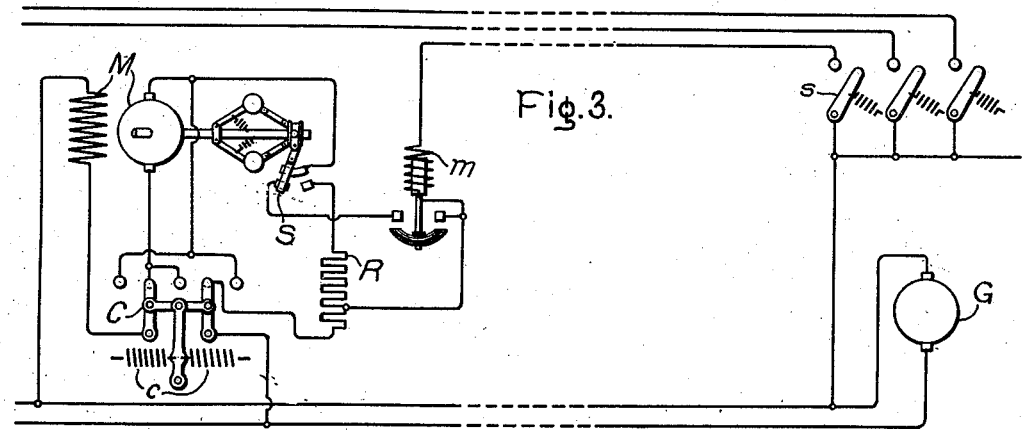
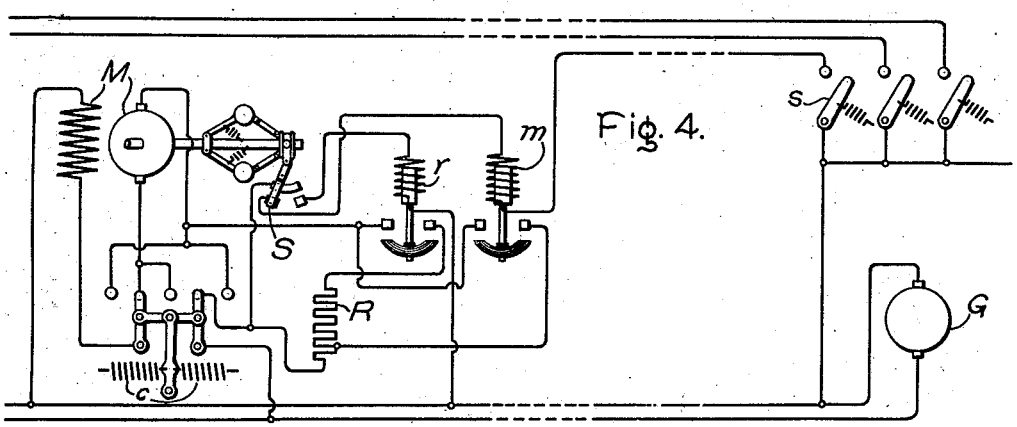
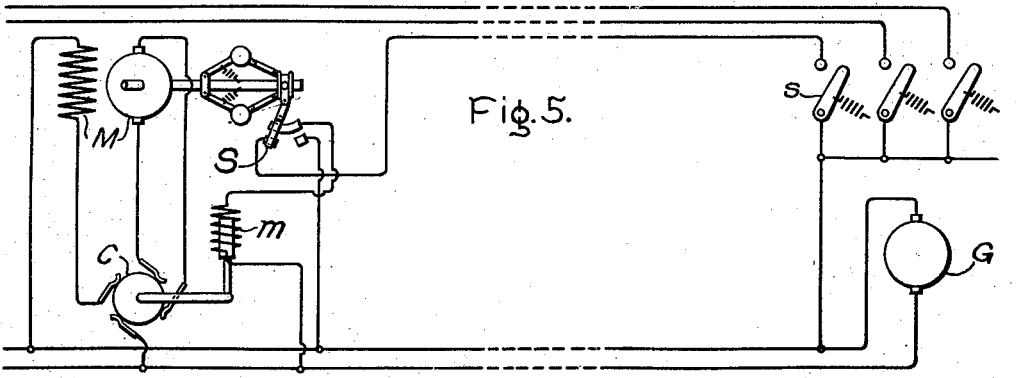
Witnesses:
Margaret E. Hooley
Helen Oxford
Inventor:
Wilbur L. Merrill
by Albert G. Davis
Atty.

UNITED STATES PATENT OFFICE.

WILBUR L. MERRILL, OF SCHENECTADY, NEW YORK, ASSIGNOR TO GENERAL ELECTRIC COMPANY, A CORPORATION OF NEW YORK.

OPERATING BULKHEAD-DOORS.

No. 835,362.  Specification of Letters Patent.  Patented Nov. 6, 1906.

Application filed January 19, 1906. Serial No. 296,805.

*To all whom it may concern:*

Be it known that I, WILBUR L. MERRILL, a citizen of the United States, residing at Schenectady, county of Schenectady, State of New York, have invented certain new and useful Improvements in Operating Bulkhead-Doors, of which the following is a specification.

My invention relates to the operation of motors controlled from a distant point; and its object is to provide simple means for automatically breaking the motor-circuit when the motor is stopped by an overload, which means will not interrupt the supply of current as long as the motor is running no matter how great the load may be. In certain cases—as, for instance, in the operation of bulkhead-doors on board ship—it is frequently undesirable to employ overload-circuit breakers in the motor-circuits actuated by the motor-current, since in case of an emergency it is important that the doors should be closed, even though in closing a motor may be seriously overloaded by an obstacle, such as coal, being in the way of the door; but when a motor is actually stalled and is doing no useful work it should be cut out in order to prevent unnecessarily loading the system and possible injury to the motor. I shall consequently illustrate and describe my invention as applied to the control of motors operating bulkhead-doors; but it will be understood that my invention is not limited to this particular application, but may be used in the control of motors operating other devices, such as valves which may require so much power to start them that ordinary overload devices are out of the question.

My invention consists in the combination, with an electric motor and means controllable at a distance for closing the motor-circuit to start the motor, of means controlled by the speed of the motor for closing the motor-circuit independently of the distant control. In other words, when the motor is at rest the distant controlling means operates to start the motor; but when the motor is up to speed the speed-controlled means comes into play to close the motor-circuit independently of the distant controlling means, so that whether the distant-control circuit is kept closed or not the motor continues in operation until it is stopped by mechanical overload, at which time the speed-controlled device automatically opens the motor-circuit.

My invention further comprises a number of other features, which will best be understood by reference to the accompanying drawings, in which—

Figure 1 shows a front elevation of a bulkhead-door operated by an electric motor adapted to be controlled in accordance with my invention. Fig. 2 shows a side elevation of the same with the bulkhead in cross-section, showing the speed-controlled device. Fig. 3 shows a diagram of the circuit connections. Fig. 4 shows a modification of the same, and Fig. 5 shows still a further modification.

In Figs. 1 and 2, A represents a water-tight bulkhead provided with a vertically-sliding door B. The door is raised and lowered by an electric motor M, which carries on its shaft a worm $d$, engaging a worm-wheel D, which is connected through a pinion $e$ with a rack E on the door B. The door is thus moved up or down according to the direction of the motor M. C represents a controlling-switch for the motor, provided with operating-handles on both sides of the bulkhead, so that a man on either side of the bulkhead may operate the motor to raise or lower the door. $m$ represents an electromagnet the circuit of which is controlled from a distant point and which serves to close the motor-circuit to lower the door. This result may be obtained either by connecting the magnet $m$ mechanically to the controlling-switch C, as indicated in Fig. 2, so as to move the switch to lowering position, or by means of separate contacts actuated by the magnet, as shown in later figures. S represents a switch actuated by a centrifugal device on the motor-shaft and adapted to assume either of two positions according as the motor is at rest or running.

One arrangement of circuit connections is shown in Fig. 3. In this figure, G represents the source of current for the motor M. The controlling-switch C is shown with centering-springs $c$ to hold it normally in mid-position when not moved by a man at the door. $s$ represents the switch at a distant station, which is normally held open by a spring, as shown. R represents a resistance adapted for connection in the motor-circuit. In this figure the magnet $m$ instead of being connected to the switch C controls separate contacts. The operation of the arrangement shown in Fig. 2 is as follows: To start the motor from the distant station, the switch s is closed and held closed momentarily. A current then passes form one terminal of the generator G through the switch s, through magnet m, a portion of resistance R, and switch C to the other terminal of the generator. Magnet m is consequently energized, drawing up its core and closing a circuit from one generator-terminal through switch C, a portion of resistance R, contacts controlled by magnets m, switch S, armature of motor M, switch C, field of motor M to the other generator-terminal. The motor consequently starts with a small portion of resistance R in circuit. As soon as the motor acquires any speed the centrifugal device on the motor-shafts acts so as to pull switch S to its other position This movement of the switch opens the circuit through the contacts of magnet m, so that after this movement of switch S occurs it is immaterial whether switch s is maintained closed or not. Consequently it is necessary to hold the switch s closed only long enough to allow the motor to start. In its new position switch S closes a circuit, as follows: from one terminal of generator G through switch C, the whole of resistance R, switch S, the motor-armature, switch C, and the motor-field to the other terminal of generator G. The motor-circuit is thus closed independently of the distant control and will operate until a mechanical overload is placed on the motor sufficient to stop it, so as to throw the centrifugally-actuated switch to its starting position.

Since the whole of resistance R is in the motor-circuit when the switch S is in running position the amount of current which the motor draws on being stalled is limited, so as to avoid unnecessarily overloading the system; but at starting only a portion of resistance R is in circuit, so that the motor is enabled to exert a very high torque to overcome the starting friction of the device which it is driving. In certain cases—such, for instance, as the operation of valves which must be moved from their seats and in which the starting friction is very high compared to the running friction and in which the seating torque desired should be lower than starting torque— this feature is of considerable importance. In the operation of other devices this feature may be omitted.

Fig. 4 shows a modification of Fig. 3, in which modification the switch S instead of being placed in the motor-circuit is placed in the control-circuit, so that instead of breaking directly the circuit closed by the magnet m it breaks the circuit indirectly by deënergizing the magnet, and similarly it closes the second circuit through the motor indirectly by energizing the relay r. The operation of this modification will be evident from the drawing and requires no further explanation.

Fig. 5 shows a further modification in which the magnet m acts directly on the manual-control switch C instead of on separate contacts When the magnet m is energized by closing switch s, it pulls the controller C into position to start the motor to lower the door. As soon as the motor starts the switch S breaks the control-circuit, but closes a second circuit through magnet m independent of the distant control. The switch C is thus held in running position until the motor is stalled.

In the arrangements of both Figs. 3 and 4 the manual movement of switch C cuts the speed-controlled switch out of circuit and enables a man at the door to control the motor independently both of the speed-controlled switch and of the distant control. In the arrangement of Fig. 5 the switch C may be moved manually whether the magnet m is energized or not. In all three arrangements the door is thus completely under the manual control of a man at the door.

Other modifications of the controlling devices and circuit connections may be employed as desired, and consequently I do not desire to limit myself to the particular construction and arrangement of parts here shown, but aim in the appended claims to cover all modifications which are within the scope of my invention.

What I claim as new, and desire to secure by Letters Patent of the United States, is—

1. In combination, an electric motor, means controllable from a distance for closing the motor-circuit, and means controllable by the speed of said motor for closing said circuit independently of the distant control.

2. In combination, an electric motor, means controllable from a distance for closing the motor-circuit, and a centrifugally-actuated switch operatively connected to the motor for closing the motor-circuit independently of the distant control.

3. In combination, an electric motor, an electromagnet, a switch at a distant point for controlling said magnet, means actuated by said magnet for closing the motor-circuit, and means controllable by the speed of said motor for controlling the motor-circuit independently of the operation of the distant switch.

4. In combination, an electric motor, an electromagnet, a switch at a distant point for controlling said magnet, means actuated by said magnet for closing the motor-circuit, and a centrifugally-actuated switch operatively connected to the motor for controlling the motor-circuit independently of the distant switch.

5. In combination, an electric motor, means controllable from a distance for starting the motor, and automatic means controlled by the motor speed for maintaining the motor-circuit closed independently of the distant control after the motor has started and for breaking the motor-circuit when the motor is stopped by an overload.

6. In combination, an electric motor, means controllable from a distance for starting the motor, and a centrifugally-actuated switch operatively connected to the motor and arranged to maintain the motor-circuit closed independently of the distant control after the motor has started and to break the motor-circuit when the motor is stopped by an overload.

7. In combination, an electric motor, an electromagnet, a manually-operated switch at a distant point for controlling said magnet arranged to open automatically when released, means actuated by said magnet for starting the motor, and means controlled by the speed of the motor for maintaining the motor-circuit closed after the motor has started independently of the distant control.

8. In combination, an electric motor, an electromagnet, a manually-operated switch at a distant point for controlling said magnet arranged to open automatically when released, means actuated by said magnet for starting the motor, and a centrifugally-actuated switch operatively connected to the motor for maintaining the motor-circuit closed independently of the distant control after the motor has started.

9. In combination, an electric motor, a device controllable from a distance for starting said motor, and an automatic switch controlled by the motor speed and controlling the motor having contacts in circuit with said device.

10. In combination, an electric motor, a device controllable from a distance for starting said motor, and a centrifugally-actuated switch operatively connected to said motor having contacts in circuit with said device.

11. In combination, an electric motor, means controllable from a distance for closing the motor-circuit, and means controlled by the speed of the motor for closing the motor-circuit through a resistance independently of the distant control.

12. In combination, an electric motor, means controllable from a distance for closing the motor-circuit, and a centrifugally-actuated switch operatively connected to the motor for closing the motor-circuit through a resistance independently of the distant control.

13. In combination, an electric motor, a device controllable from a distance for closing the motor-circuit, and means controlled by the speed of the motor for breaking the circuit established by said device and establishing another circuit through the motor.

14. In combination, an electric motor, a device controllable from a distance for closing the motor-circuit, and a centrifugally-actuated switch operatively connected to the motor for breaking the circuit established by said device and establishing another circuit through the motor.

15. In combination, an electric motor, a device controllable from a distance for closing the motor-circuit, and means controlled by the speed of the motor for breaking the circuit established by said device and establishing another circuit of higher resistance through the motor.

16. In combination, an electric motor, a device controllable from a distance for closing the motor-circuit, and a centrifugally-actuated switch operatively connected to the motor for breaking the circuit established by said device and establishing another circuit of higher resistance through the motor.

17. In a bulkhead-door system, a door, an electric motor for moving said door, an automatic switch controlled by the speed of the motor and controlling the motor-circuit, and a manually-operated switch at the door for controlling the motor independently of the speed-controlled switch.

18. In a bulkhead-door system, a door, an electric motor for moving said door, an automatic switch controlled by the speed of the motor and controlling the motor-circuit, and a manually-operated motor-controlling switch at the door arranged by its movement from off position to render the speed-controlled switch inoperative.

19. In a bulkhead-door system, a door, an electric motor for moving the door, means controllable from a distance for controlling the motor-circuit, means controllable by the speed of said motor for closing the motor-circuit independently of the distant control, and a manually-operated switch at the door for controlling the motor independently both of the distant-control and of the speed-controlled means.

20. In a bulkhead-door system, a door, an electric motor for moving the door, means controllable from a distance for closing the motor-circuit, means controllable by the speed of the motor for closing the motor-circuit independently of the distant control, a manually-operated motor-controlling switch at the door arranged by its movement from off position to render inoperative both the distant-control and the speed-controlled means, and means for returning said switch when released to off position.

21. In combination with an electric motor, a manually-operated controlling-switch for starting said motor, and a centrifugally-actuated switch operatively connected to said motor for breaking the motor-circuit when the motor comes to rest.

22. In combination with an electric motor, a manually-operated controlling-switch for starting said motor, and a centrifugally-actuated switch operatively connected to said motor and controlling said motor conjointly with said manually-operated switch, said centrifugally-actuated switch being arranged to open the motor-circuit upon the stopping of the motor when said manually-operated switch is in one of its positions.

23. In combination with an electric motor, a manually-operated switch for starting said motor, a mechanism driven by said motor adapted to bring the motor to rest at the limit of its travel, and a centrifugally-operated switch operatively connected to said motor for breaking the motor-circuit when the motor comes to rest.

24. In combination with an electric motor, a manually-operated switch for starting said motor, a mechanism driven by said motor adapted to bring the motor to rest at the limit of its travel, and a centrifugally-operated switch operatively connected to said motor for breaking the motor-circuit when the motor comes to rest when said manually-operated switch is at one of its positions.

In witness whereof I have hereunto set my hand this 17th day of January, 1906.

WILBUR L. MERRILL.

Witnesses:
BENJAMIN B. HULL,
HELEN ORFORD.